Aug. 17, 1965                M. J. ALLPORT                3,201,623
                     ALTERNATING CURRENT GENERATORS
                          Filed July 17, 1962
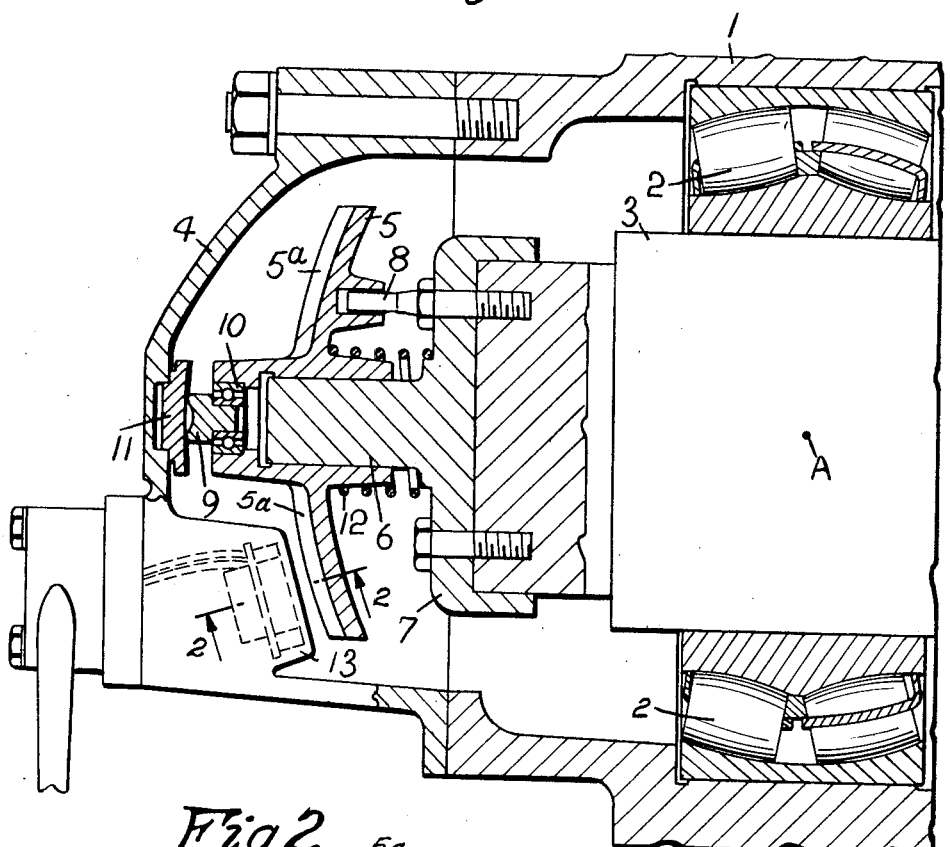
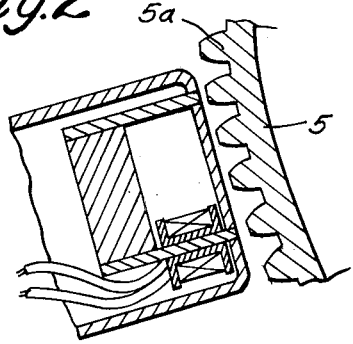

United States Patent Office 3,201,623
Patented Aug. 17, 1965

3,201,623
ALTERNATING CURRENT GENERATORS
Maurice James Allport, Pedmore, Stourbridge, England, assignor to Joseph Lucas (Industries) Limited, Birmingham, England
Filed July 17, 1962, Ser. No. 210,497
4 Claims. (Cl. 310—75)

This invention relates to alternating current generators more particularly for use in brake control means for rail coaches and of the kind described in the specification of British Patent No. 880,767. In the specification of British Patent No. 880,766 there is described a generator for this purpose which comprises a casing containing a ferrous rotor having a plurality of peripheral teeth, and a pick-up unit mounted within a pocket in the casing at one side of the rotor, said pick-up unit including a permanent magnet and a pair of toothed plates separated by an induction coil, the teeth of the two plates being so arranged that when the teeth of the one plate are in register with teeth of the rotor the teeth of the other plate are in register with the spaces between the teeth of the rotor. Such generator was intended for use with coaches wherein the wheel axles were prevented from axial movement in their bearings, and wherein the bearings did not permit of angular movement of the axis of the shaft. However, in certain coaches the wheel axles are permitted limited axial movement in spherical bearings which will permit angular movement of the axis of the shaft, and the object of the present invention is to provide a construction suitable for use with such coaches.

A generator according to the invention comprises in combination a casing, a toothed rotor in the casing, means mounting said rotor on an axle so as to prevent relative rotation whilst permitting relative axial movement, a spring urging the rotor away from the axle into contact with a relatively fixed stop in the casing, a relatively fixed pick-up unit having teeth presented to the teeth of the rotor, said rotor being in the form of a crown wheel having radial teeth on its face remote from the axle, said radial teeth having crests which have an arc of curvature in a radial direction struck from the centre of the adjacent bearing of the axle whereby the gap between the teeth of the rotor and the teeth of the pick-up will be maintained substantially constant irrespective of the angle of the axis of the axle.

FIGURE 1 is a sectional view of one example of the invention, and
FIGURE 2 is a sectional view on the line 2—2 of FIGURE 1.

The drawings illustrate the invention as applied to a railway coach wherein the axle boxes (of which one is seen at 1) incorporate bearings 2 which will permit limited axial movement of the contained axles, and will also permit the axis of axle 3 to move angularly. Within a cover 4 connected to the outside of one of the axle boxes 1 of the coach is an alternator rotor 5. The rotor 5 is mounted upon a stub axle 6 extending from the centre of a cup-like part 7 surrounding, and bolted to the adjacent end of the axle 3. Moreover, the rotor 5 is adapted to be driven by the axle 3 through an eccentrically disposed peg 8, but is permitted axial freedom of movement relative to the axle.

A co-axially disposed hardened steel pin 9 is mounted by means of an anti-friction bearing 10 at the outer side of the rotor (i.e. the side remote from the axle), and this pin 9 is held in contact with a hardened steel pad 11 on the cover 4 by a coiled compression spring 12 interposed between the rotor and the part 7. As a result, the axial position of the rotor will be constant irrespective of axial movements of the axle.

The rotor is in the form of a ferrous crown wheel having radially disposed teeth 5a extending from its outer face (i.e. its face remote from the axle). The teeth 5a are presented to the toothed plates of a pick-up unit 13 mounted within the cover 4.

In order to maintain the gap between the teeth 5a of the rotor and pick-up 13 substantially constant irrespective of the angular position of the axis of the axle 3 the outer surface of the crests of the teeth 5a of the rotor are given an arc of curvature which is struck from the centre A of the adjacent axle bearing 2, and the hardened pad has a concave spherical bearing surface struck from the same centre A. The end of the pin 9 bearing against this surface may be dished as shown to provide circular line contact.

Having thus described my invention what I claim as new and desire to secure by Letters Patent is:

1. An alternating current generator comprising in combination, a casing, a toothed rotor in the casing, an axle, means mounting said rotor on said axle, so as to prevent relative rotation while permitting relative axial movement, a relatively fixed stop in the casing, a spring urging the rotor away from the axle into contact with said relatively fixed stop, a relatively fixed pick up unit having teeth presented to the teeth of the rotor, said rotor being in the form of a crown wheel having radial teeth on its face remote from the axle, said radial teeth having crests which have an arc of curvature in a radial direction struck from a point on the axle lying on the axis of the adjacent supporting bearing of the axle whereby the gap between the teeth of the rotor and the teeth of the pick up will be maintained substantially constant irrespective of the angle of the axis of the axle.

2. An alternating current generator comprising in combination, a casing, a toothed rotor in the casing, an axle, means mounting said rotor on said axle so as to prevent relative rotation while permitting relative axial movement, a relatively fixed stop in the casing, a spring urging the rotor away from the axle into contact with said relatively fixed stop, said stop having a concave spherical face presented to the rotor, the arc of curvature of said face being struck from a point on the axle lying on the axis of the adjacent supporting bearing of the axle, a relatively fixed pick up unit having teeth presented to the teeth of the rotor, said rotor being in the form of a crown wheel having radial teeth on its face remote from the axle, said radial teeth having crests which have an arc of curvature in a radial direction struck from a point on the axle lying on the axis of the adjacent supporting bearing of the axle whereby the gap between the teeth of the rotor and the teeth of the pick up will be maintained substantially constant irrespective of the angle of the axis of the axle.

3. An alternating current generator as claimed in claim 2 including a pin co-axially mounted on the rotor by means of an anti-friction bearing.

4. An alternating current generator comprising, in combination, a casing, a toothed rotor in the casing, an axle, means mounting said rotor on said axle so as to prevent relative rotation while permitting relative axial movement, a stop mounted in the casing and against which the rotor bears, a relatively fixed pick-up unit having teeth presented to the teeth of the rotor, said rotor being in the form of a crown wheel having radial teeth on its face remote from the axle, said radial teeth having crests which have an arc of curvature in a radial direction struck from a point on the axle lying on the axis of the adjacent supporting bearing of the axle whereby the gap between the teeth of the rotor and the teeth of the pick-up unit will be maintained substantially constant irrespective of the angle of the axis of the axle.

References Cited by the Examiner

UNITED STATES PATENTS 1,585,566  5/26  Sindl _____ 310—268

FOREIGN PATENTS 321,549  11/29  Great Britain.

ORIS L. RADER, *Primary Examiner.*

MILTON O. HIRSHFIELD, *Examiner.*